US012389150B2

(12) United States Patent
Andrikowich et al.

(10) Patent No.: US 12,389,150 B2
(45) Date of Patent: Aug. 12, 2025

(54) AUDIO HEADSET WITH REMOVABLY COUPLED EARPHONES

(71) Applicant: Bose Corporation, Framingham, MA (US)

(72) Inventors: Thomas George Andrikowich, Whitinsville, MA (US); Alexander Stefanov Petrov, Marlborough, MA (US)

(73) Assignee: Bose Corporation, Framingham, MA (US)

( * ) Notice: Subject to any disclaimer, the term of this patent is extended or adjusted under 35 U.S.C. 154(b) by 212 days.

(21) Appl. No.: 18/084,922

(22) Filed: Dec. 20, 2022

(65) Prior Publication Data

US 2024/0205580 A1 Jun. 20, 2024

(51) Int. Cl.
*H04R 1/10* (2006.01)

(52) U.S. Cl.
CPC ....... *H04R 1/1008* (2013.01); *H04R 2420/07* (2013.01)

(58) Field of Classification Search
CPC .......................... H04R 1/1008; H04R 2420/07
See application file for complete search history.

(56) References Cited

U.S. PATENT DOCUMENTS 10,743,106 B2 8/2020 Daley et al.
10,848,870 B2 11/2020 Daley et al.
11,272,287 B2 3/2022 Daley et al.
11,509,992 B2 11/2022 Yamkovoy
11,665,462 B1 * 5/2023 LeBlanc .............. H04R 5/0335 381/74
2008/0298613 A1 * 12/2008 Slamka ................... H04M 1/05 381/311
2010/0296683 A1 * 11/2010 Slippy .................. H04R 5/0335 381/377
2016/0267898 A1 * 9/2016 Terlizzi ............ G10K 11/17885
2017/0325738 A1 * 11/2017 Antos .................. H04R 1/1041
2018/0027317 A1 * 1/2018 Peeters ................ H04R 1/2811 381/373
2022/0021959 A1 1/2022 Andrikowich et al.
2022/0210533 A1 * 6/2022 Lin ........................ H04R 1/105
2023/0379629 A1 * 11/2023 Welti ....................... H04R 1/06

FOREIGN PATENT DOCUMENTS

KR 101889021 B1 * 8/2018

OTHER PUBLICATIONS

Translation of KR101889021B1 (Year: 2018).*

* cited by examiner

*Primary Examiner* — Andrew Sniezek
(74) *Attorney, Agent, or Firm* — Hoffman Warnick LLC

(57) ABSTRACT

Various implementations include audio headsets. In one implementation an audio headset includes: a pair of earphones; a headband connecting the pair of earphones; and a cable connecting the pair of earphones through the headband, where the earphones are removably coupled with one another such that the audio headset is operational with only one of the earphones.

22 Claims, 8 Drawing Sheets

AUDIO HEADSET WITH REMOVABLY COUPLED EARPHONES

TECHNICAL FIELD

This disclosure generally relates to headsets. More particularly, the disclosure relates to audio headsets with removably coupled earphones.

BACKGROUND

Conventional headphones include a set of earcups joined by a headband. In some configurations, the earcups, associated wiring, and/or electronics in the headband may benefit from servicing.

SUMMARY

All examples and features mentioned below can be combined in any technically possible way.

Various implementations include audio headsets. In particular aspects, an audio headset includes: a pair of earphones; a headband connecting the pair of earphones; and a cable connecting the pair of earphones through the headband, where the earphones are removably coupled with one another such that the audio headset is operational with only one of the earphones.

Implementations may include one of the following features, or any combination thereof.

In certain cases, the headband includes a first headband segment, a second headband segment, and a spring connecting the first headband segment and the second headband segment.

In some aspects, the spring is located at a top portion of the audio headset when worn by a user.

In particular implementations, the spring includes a slot, and the cable extends from the first headband segment to the second headband segment through the slot.

In certain cases, the spring is located at a hinge between the first headband segment and the second headband segment, where the hinge is visible from an exterior of the audio headset, and the cable is visually obstructed at the exterior of the audio headset.

In some implementations, the spring includes at least one torsion spring that provides a linear clamping force on the headband.

In particular aspects, the linear clamping force enhances acoustic performance for the audio headset across a variety of users having distinct head sizes. In some examples, the enhanced acoustic performance is characterized by an improved acoustic seal, improved communications, and/or improved noise cancelation and/or active noise reduction.

In some cases, a portion of the cable extending through the headband is positioned in an in-line switchback configuration to mitigate mechanical stress on the cable in response to adjustment (e.g., vertical adjustment) of at least one of the earphones. For example, the in-line switchback configuration can be along an arced plane or path defined by an arc axis, where the cable has a uniform height but switches back (or squiggles) around the axis. In certain cases, the switchback configuration allows for an amount of extension in the earphones to accommodate distinct head sizes. In some cases, the extension amount is equal to approximately 50 millimeters (mm) to approximately 70 mm, and in particular cases, approximately 60 mm.

In particular implementations, the headset further includes a removable cable holder in at least one section of the headband for enabling removal of the portion of the cable.

In certain aspects, the headset further includes an adjustment limiter for preventing unintentional removal of the removable cable holder.

In some cases, the headset further includes a circuit board in the headband, where the cable includes a first section connected with a first one of the earphones and a first side of the circuit board, and a second section connected with a second one of the earphones and a second side of the circuit board. In some examples, the circuit board includes a printed circuit board (PCB), such as a PCB-A.

In particular aspects, through-headband wiring of the cable mitigates mechanical stress on the connection between the first section and the circuit board and the second section and the circuit board.

In certain implementations, the headset further includes a removable cap on at least a portion of the headband, where the cap enables access to at least one of the connection between the first section and the circuit board or the connection between the second section and the circuit board.

In some cases, the headset further includes at least one grounding wire connected with the circuit board for providing electro-static discharge (ESD) protection for the audio headset. In some examples, the grounding wire provides ESD protection from the metal in the torsion spring. In further examples, the grounding wire is the only grounding point for the headband cable.

In particular aspects, the first section has a multi-pin segment connector for connecting with the circuit board.

In certain implementations, the second section is fixed to the circuit board.

In some aspects, each earcup includes a driver, and the cable connects with each earcup proximate an acoustically sealed back volume behind the driver. In certain examples, the wiring in each earcup is part of a sealed assembly behind the ear. In further examples, the sealed assembly can enhance passive noise attenuation in the headset.

In particular cases, the audio headset is operational with only one of the earphones such that with one of the earphones removed, a remaining earphone is connected to a power source, enables audio output, and enables audio communication.

In certain aspects, each of the earphones contains a separate microprocessor for enabling independent operation thereof.

In some cases, the pair of earphones includes a pair of earcups.

In particular implementations, the pair of earcups includes a pair of earbuds, a pair of on-ear headphones, or a pair of near-ear headphones.

In certain aspects, the headset further includes an electro-acoustic transducer in each of the earcups for providing an audio output to a user.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

Figure 1:
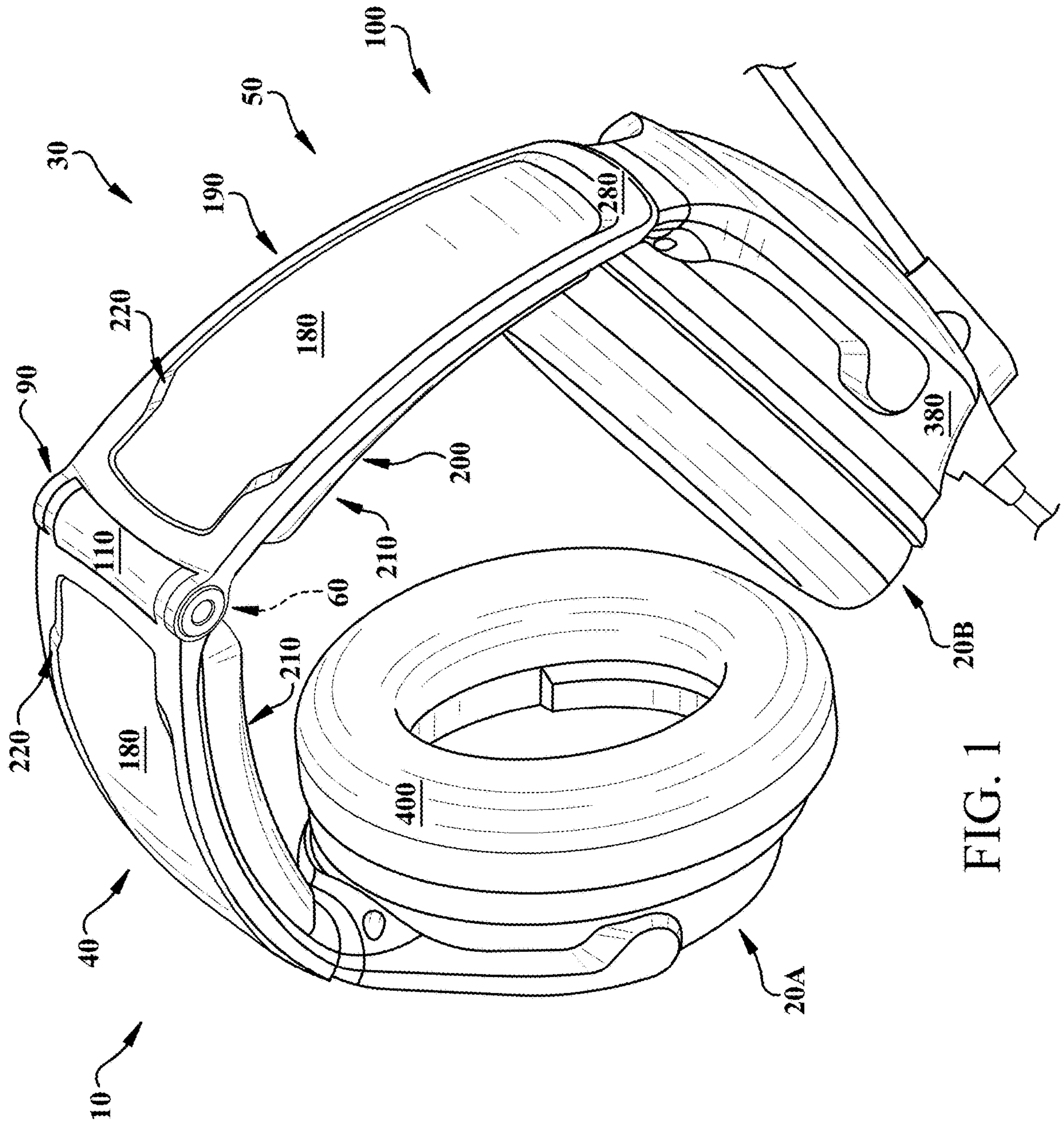
FIG. 1 shows a perspective view of a headset according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that an audio headset can benefit from removably coupled earphones that enable servicing, replacement, and/or modularity in operation. In certain examples, an audio headset includes a removably coupled earphone. In particular examples, the audio headset is configured to operate with only one of the coupled earphones.

Commonly labeled components in the FIGURES are considered to be substantially equivalent components for the purposes of illustration, and redundant discussion of those components is omitted for clarity.

A headphone refers to a device that fits around, on, or in an ear and that radiates acoustic energy into the ear canal. Headphones are sometimes referred to as earphones, earpieces, headsets, earbuds or sport headphones, and can be wired or wireless. A headphone includes an acoustic driver to transduce audio signals to acoustic energy. The acoustic driver may be housed in an earphone, which in particular cases, is an earcup. While some of the figures and descriptions following may show a single earphone, an earphone may be a single stand-alone unit or one of a pair of earphones (each including a respective acoustic driver and earcup), one for each ear. An earphone may be connected mechanically to another earphone, for example by a headband and/or by leads that conduct audio signals to an acoustic driver in the earphone. An earphone may include components for wirelessly receiving audio signals. An earphone may include components of an active noise reduction (ANR) system. Earphones may also include other functionality such as a microphone so that they can function as a headset.

In an around or on-the-ear headset, the headset may include a headband and at least one earphone that is arranged to sit on or over an ear of the user. In order to accommodate heads of different sizes and shapes, the earphones are configured to pivot about the vertical and/or horizontal axes, and to translate for some distance along the vertical axis.

Headsets according to various implementations can include a pair of earphones (e.g., on-ear, over-ear, or in-ear) with a headband connecting the earphones. A cable extends through the headband and connects the earphones. The earphones are removably coupled with one another such that the headset is operational with only one of the earphones. In various implementations, the removably coupled earphone(s) can be serviced, replaced, and/or stored while the headset remains operational with the other one of the earphones.

FIG. 1 shows a perspective view of an audio headset (or, headset) 10 according to various implementations. As shown, headset 10 can include a pair of earphones 20 (separately denoted as 20A, 20B) configured to fit over the ear, or on the ear, of a user. A headband 30 spans between and connects the pair of earphones 20 (for example, depicted as earcups) and is configured to rest on the head of the user (e.g., spanning over the crown of the head or around the head). In various implementations, a position of one or both earphones 20 can be adjusted relative to the headband 30, e.g., in terms of rotation, tilt, or vertical adjustment. In particular implementations, the headset 10 includes an aviation headset, a communications headset or a military headset. In further implementations, the headset 10 is configured for use as a personal (e.g., consumer) headset. Various examples of features of the headset 10, along with description of example accessories to the headset 10, are described in U.S. patent application Ser. No. 16/930,579 ("Wearable Audio Device with Modular Component Attachment," filed Jul. 16, 2020) and U.S. patent application Ser. No. 16/953,272 ("Wearable Audio Device with Control Platform," filed Nov. 19, 2020), each of which is incorporated by reference in its entirety.

In some cases, the headband 30 can include a first headband segment 40 and a second headband segment 50 that are connected by a spring 60. In various implementations, the spring 60 is located at a top portion of the headset 10 when worn by a user, e.g., proximate the crown or mid-scalp region of the user's head. In certain examples, the spring 60 is optional, such that the headband 30 can be formed of a continuous headband spring (also called a "continuous spring section"), such as described in U.S. Pat. No. 10,743,106 ("Headphone Earcup Mount in Continuous Headband-Spring Headphone System," issued Aug. 11, 2020), which is incorporated by reference in its entirety.

Figure 2:
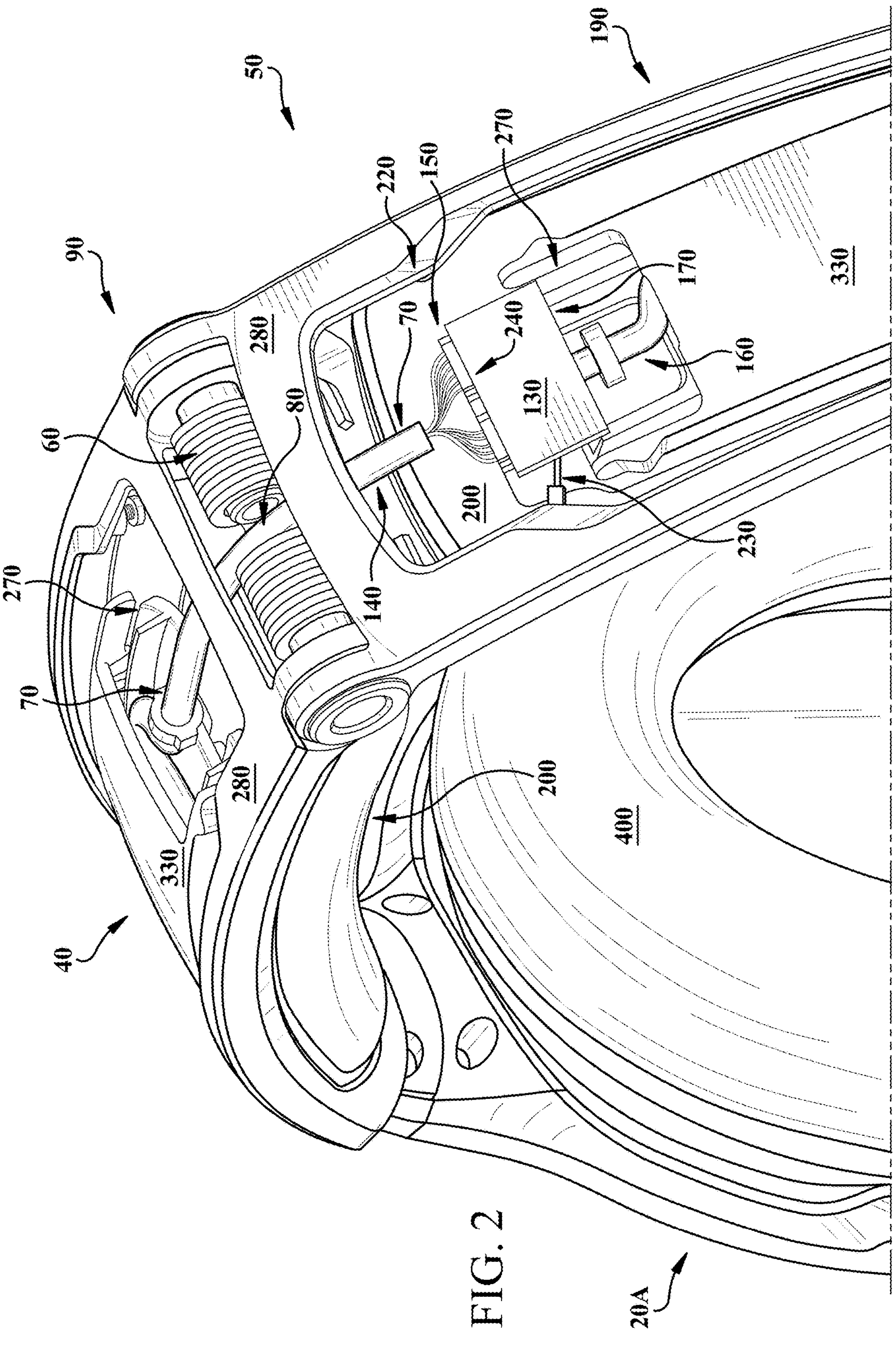
FIG. 2 shows a close-up partial section view of the headband section of a headset according to various implementations.

In some implementations, as depicted in the partial cutaway perspective of the headset 10 in FIG. 2, a cable 70 connects the earphones 10 through the headband 30. In particular cases, the spring 60 includes a slot 80, such that the cable 70 extends from the first headband segment 40 to the second headband segment 50 through the slot 80 in the spring 60. The spring 60 can be located at a hinge 90 between the first headband segment 40 and the second headband segment 50. In certain cases (e.g., as seen in FIG. 1), the hinge 90 is visible from an exterior 100 of the headset 10. In these cases, the cable 70 is visually obstructed at the exterior 100 or the headset 10. In particular implementations, the hinge 90 includes a top cap 110 that covers the spring 60 and the cable 70, and, e.g., provides ingress protection for the spring 60 and/or the cable 70. Further, as illustrated in the partial cut-away view in FIG. 5, routing of the cable 70 through the slot 80 in the spring 60 can prevent the cable 70 from escaping the housing of the headband segments 40, 50, and/or hinge 90 and avoid contacting the user's head during use (e.g., causing discomfort).

The spring 60 can include at least one torsion spring that provides a linear clamping force on the headband 30, e.g., a linear clamping force between headband segments 40, 50. In certain cases, the spring 60 can include multiple segments, which may or may not be coupled. In a particular example, as illustrated in the cut-away view of a portion of the headset 10 in FIG. 3 and exploded view of the spring 60 in FIG. 4, the spring 60 can include a single torsion spring with at least one arm 120A configured to contact the first headband segment 40 and at least one arm 120B (two shown) configured to contact the second headband segment 50. In various implementations, the spring 60 provides a linear clamping force on the headset 10 that enhances acoustic performance for the headset 10, e.g., across a variety of users having distinct head sizes. In some examples, the enhanced acoustic performance is characterized by an improved acoustic seal, improved communications, and/or improved noise cancelation and/or active noise reduction.

Figure 3:
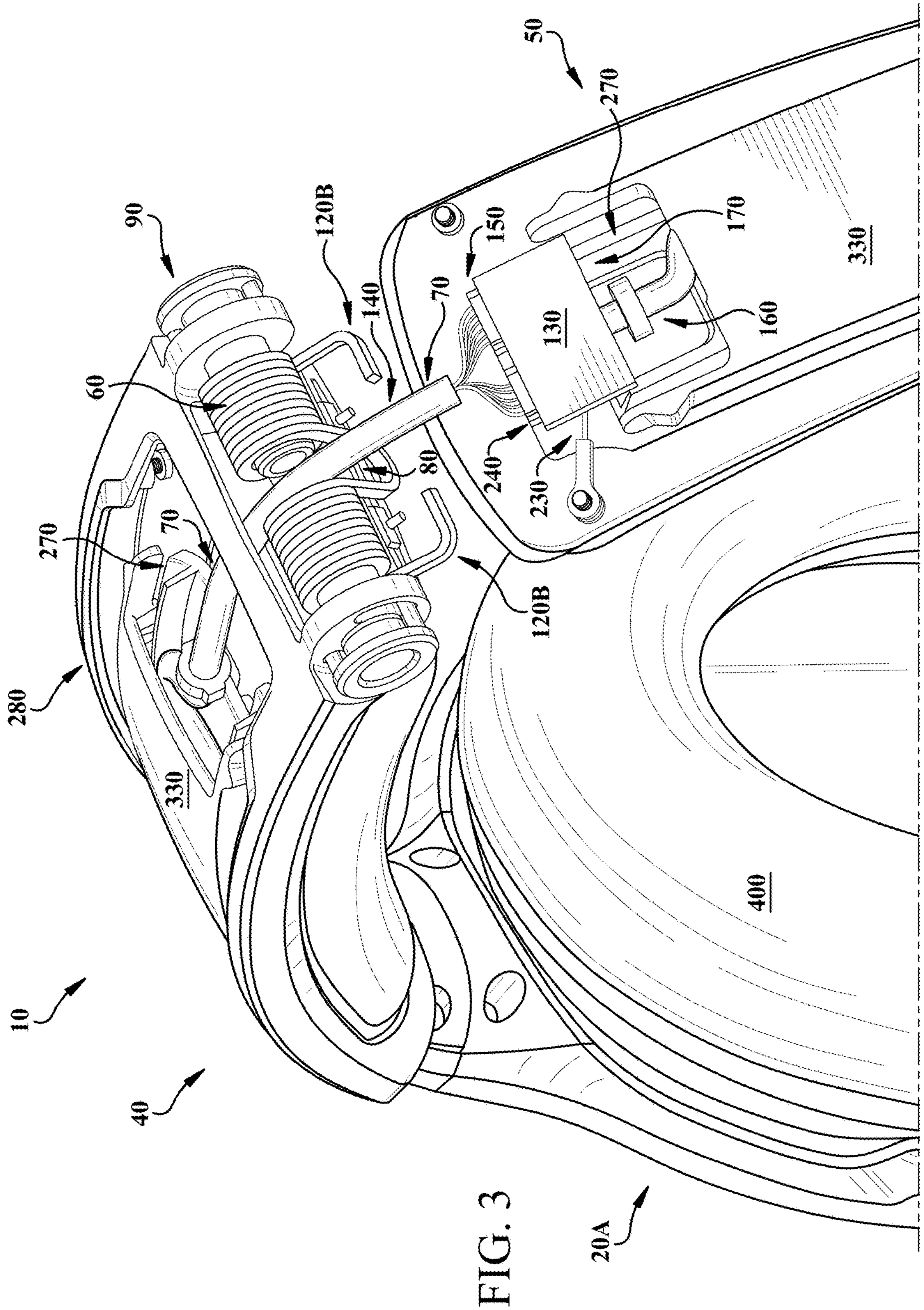
FIG. 3 shows further detail of the headband section of FIG. 2.
Figure 4:
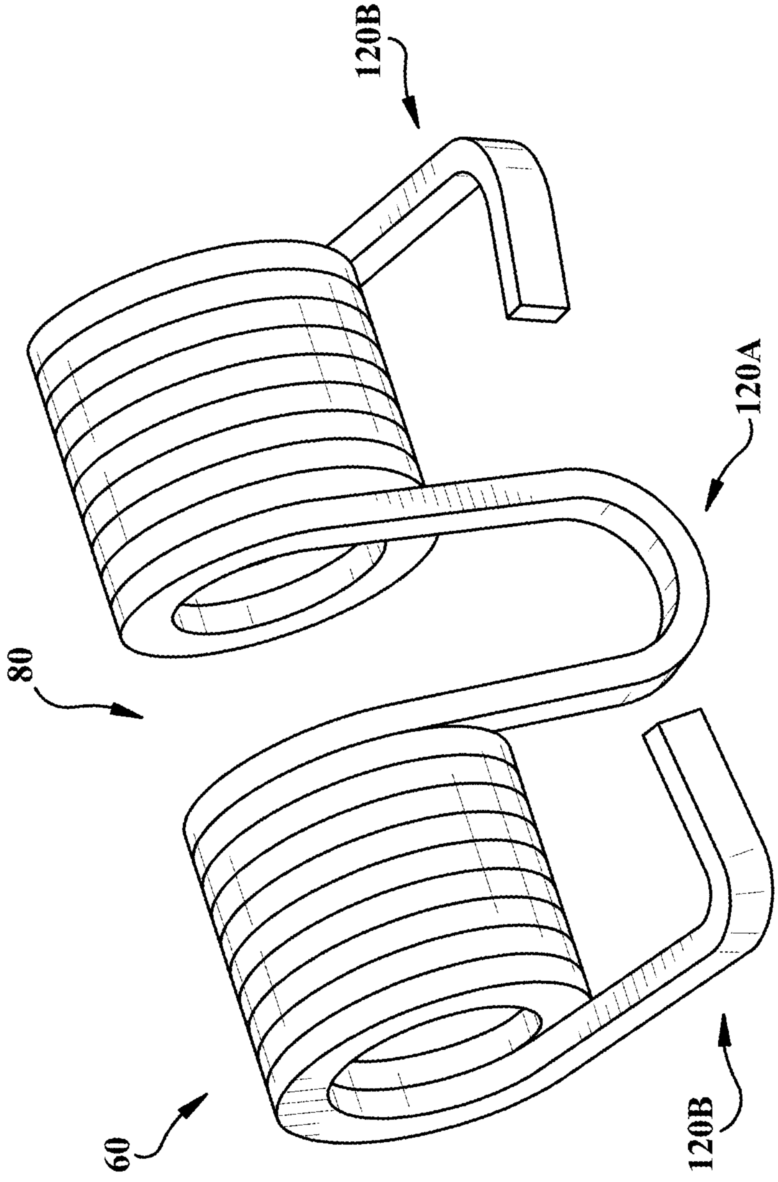
FIG. 4 shows a perspective view of a spring in a headset according to various implementations.

As illustrated in FIGS. 2-4, the headset 10 can include a circuit board 130 in the headband 30. In the example illustrated in FIGS. 2-4, the circuit board 130 is located in the second headband segment 50, however, the circuit board 130 can be located in the first headband segment 40 in various implementations. In particular aspects, the cable 70 includes a first section 140 connected with a first one of the earphones 20A and a first side 150 of the circuit board 130, and a second section 160 connected with a second one of the earphones 20B and a second side 170 of the circuit board 130. In some examples, the circuit board 130 includes a printed circuit board (PCB), such as a PCB-A. In particular cases, the circuit board 130 is configured to control audio signal and/or control signals to one or both earphones 20A, 20B. In particular cases, the circuit board 130 can aid in controlling one or more of audio and/or signal routing, power delivery, or grounding of the headset 10. In some cases, each earphone 20A, 20B includes its own microprocessor (e.g., in earphone casing 380) for controlling audio output to an associated transducer. In these cases, each earphone 20A, 20B can control audio output and/or additional audio and/or signal control and communication functions independently of the other earphone. That is, as described herein, the circuit board 130 can enable modular coupling of the earphones 20A, 20B with the headband 30, for example, enabling the headset 10 to operate with only one of the earphones 20 coupled with the circuit board 130. In certain of these cases, a user may choose to remove either earphone 20A, 20B from the headset 10 (e.g., based on user preference, comfort, etc.) while maintaining functionality of the headset 10 with only the remaining earphone.

In particular aspects, through-headband wiring of the cable 70 mitigates mechanical stress on the connection between the first section 140 and the circuit board 130 and the second section 160 and the circuit board 130. In certain implementations, e.g., as illustrated in FIGS. 1, 2, and 5-8, the headset 10 further includes a removable cap 180 on at least a portion of the headband 20, where the cap 180 enables access to the connection between the first section 140 and the circuit board 130 and/or the connection between the second section 160 and the circuit board 130. In some cases, the cap 180 is located on a top (or outer, upper) side 190 of the headband 20, e.g., in one of the segments 40, 50. In additional implementations, another cap 200 is located on a bottom (or inner, lower) side 210 of the headband 20, e.g., in the same segment 40, 50. In particular cases, the lower cap 200 is part of the head cushion, or connected with the head cushion when installed. The upper cap 180 can be configured to engage a slot 220 in the upper side 190 of the headband, and in some cases, is mechanically coupled with a mating feature in the slot 220, e.g., with a set of male/female mating features, snap-fit or pressure-fit features, etc. In certain examples, the upper cap 180 and/or lower cap 220 can include multiple components, e.g., sub-caps or sections that are removably coupled with the frame 280 of the headband 20. In any case, the upper cap 180 and/or lower cap 200 can allow a user to access the connection between the first section 140 and the circuit board 130 and/or the connection between the second section 160 and the circuit board 130.

In some cases, as seen most clearly in FIGS. 2-4, the headset 10 further includes at least one grounding wire 230 connected with the circuit board 130 for providing electrostatic discharge (ESD) protection for the headset 10. In some examples, the grounding wire 230 provides ESD protection from the metal in the spring 60. In particular examples, the grounding wire 230 is the only grounding point for the headband cable 70. As is further evident in FIGS. 2-4, and also in FIG. 6, in certain cases, the first section 140 of cable 70 has a multi-pin segment connector 240 for connecting with the circuit board 130 (e.g., at first side 150). In various implementations, the multi-pin connector 240 is removably coupled with the circuit board 130, such that the multi-pin connector 240 can be coupled and de-coupled from the circuit board 130, e.g., by hand and/or with a tool. In some implementations, the second section 160 of the cable 70 is fixed to the circuit board 130 (e.g., at second side 170). In these implementations, removal of earcup 20B from headset 10 includes removal of the circuit board 130. In these cases, as noted herein, the headset 10 is configured to operate with only the remaining earcup 20A, e.g., functioning with the microprocessor in earcup 20A and without direct connection to the circuit board 130.

Figure 5:
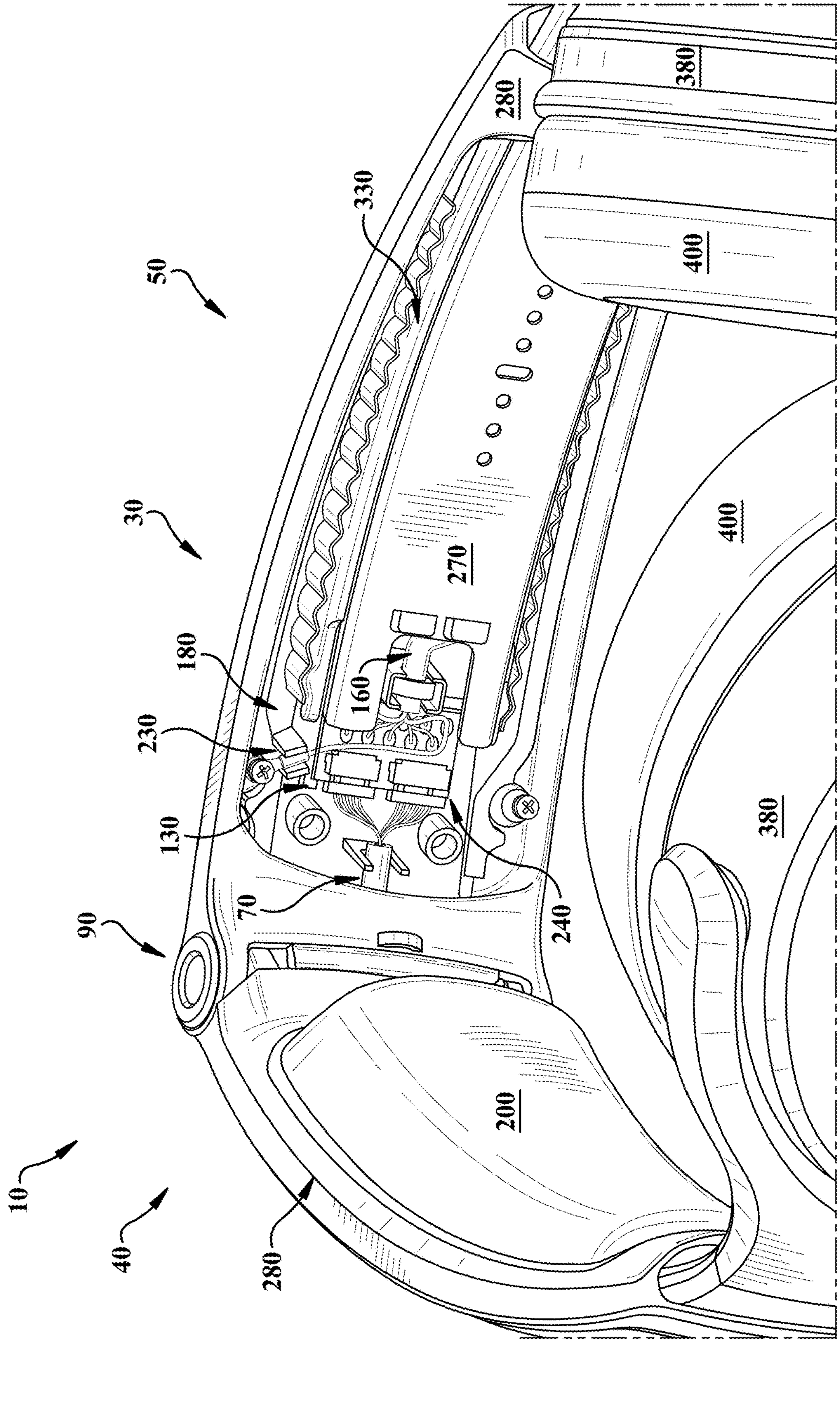
FIG. 5 shows a partial cross-sectional view of a portion of a headband in a headset according to various implementations.
Figure 6:
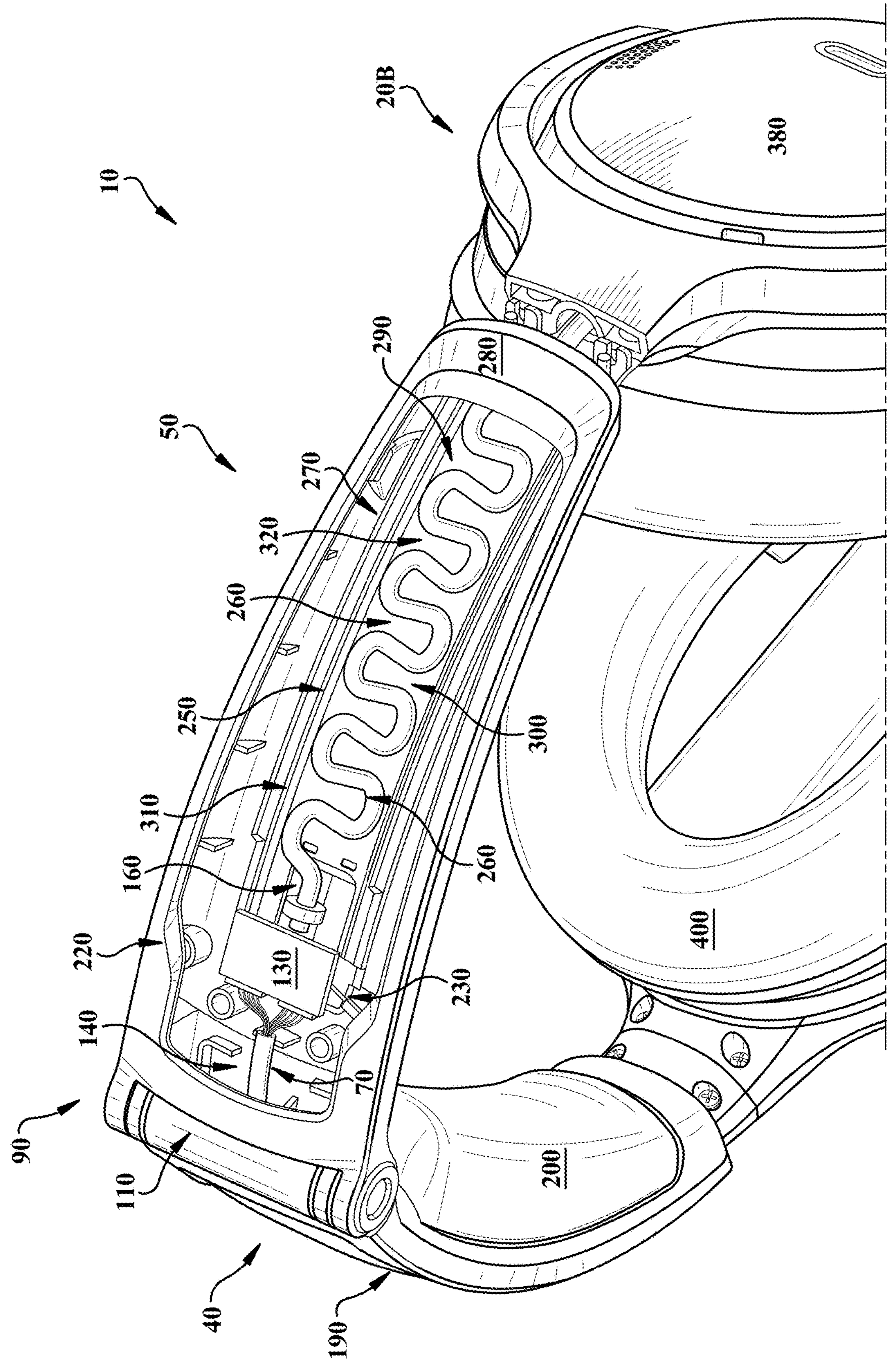
FIG. 6 shows a close-up partial section view of the headband section of a headset according to various implementations.

As noted herein, the cable 70 can connect the earphones 20 through the headband 30 and enable the earphones 20 to be removably coupled with one another (and the headband 30). In some cases, a portion 250 of the cable 70 extending through the headband 30 is positioned in an in-line switchback configuration 260 to mitigate mechanical stress on the cable 70 in response to adjustment (e.g., vertical adjustment) of at least one of the earphones 20. For example, the in-line switchback configuration 260 can be along an arced plane or path defined by an arc axis (a) (FIG. 7), where the cable 70 has a uniform height but switches back (or squiggles) around the axis (a). In certain cases, the in-line switchback configuration 260 allows for an amount of extension in the earphones 20 to accommodate distinct head sizes. For example, the in-line switchback configuration 260 can allow for approximately 50 millimeters (mm) of extension to approximately 70 mm of extension. In certain cases, the in-line switchback configuration 260 allows for approximately 60 mm of extension, +/−several mm. Additionally, in certain implementations, the headset 10 includes a removable cable holder 270 (FIGS. 2, 5, 6, 7) in at least one section of the headband 30 for enabling removal of the portion of 250 of the cable 70. In certain implementations, the removable cable holder 270 is configured to translate (e.g., slide) relative to the frame 280 of the headband 30, and guide the cable 70 during insertion and/or removal of the cable 70 from the headband 30. In particular cases (e.g., as seen in FIGS. 5 and 6), the removable cable holder 270 includes a tray 290 that is sized to accommodate the in-line switchback configuration 260 of the cable 70. In some cases, the tray 290 is defined by a platform 300 with a set of sidewalls 310 (e.g., two approximately parallel sidewalls) extending therefrom. The tray 290 can include an opening 320 (e.g., opening facing the outer, upper portion of the headband 30) that enables access to the cable 70 while the cable 70 remains coupled with the circuit board 130. In some cases, as illustrated in FIGS. 2 and 3, the headset can further include a cable cover 330 that is configured to cover (or, shield) the cable 70 from the perspective of the upper, or outer portion of the headband 30. In some cases, the cable cover 330 is removed prior to removal of the cable 70 and the removable cable holder 270 (e.g., in decoupling of an earcup 20 from headset 10), and is installed after installation of the cable 70 and removable cable holder 270 (e.g., in coupling of an earcup 20 to the headset 10).

Figure 7:
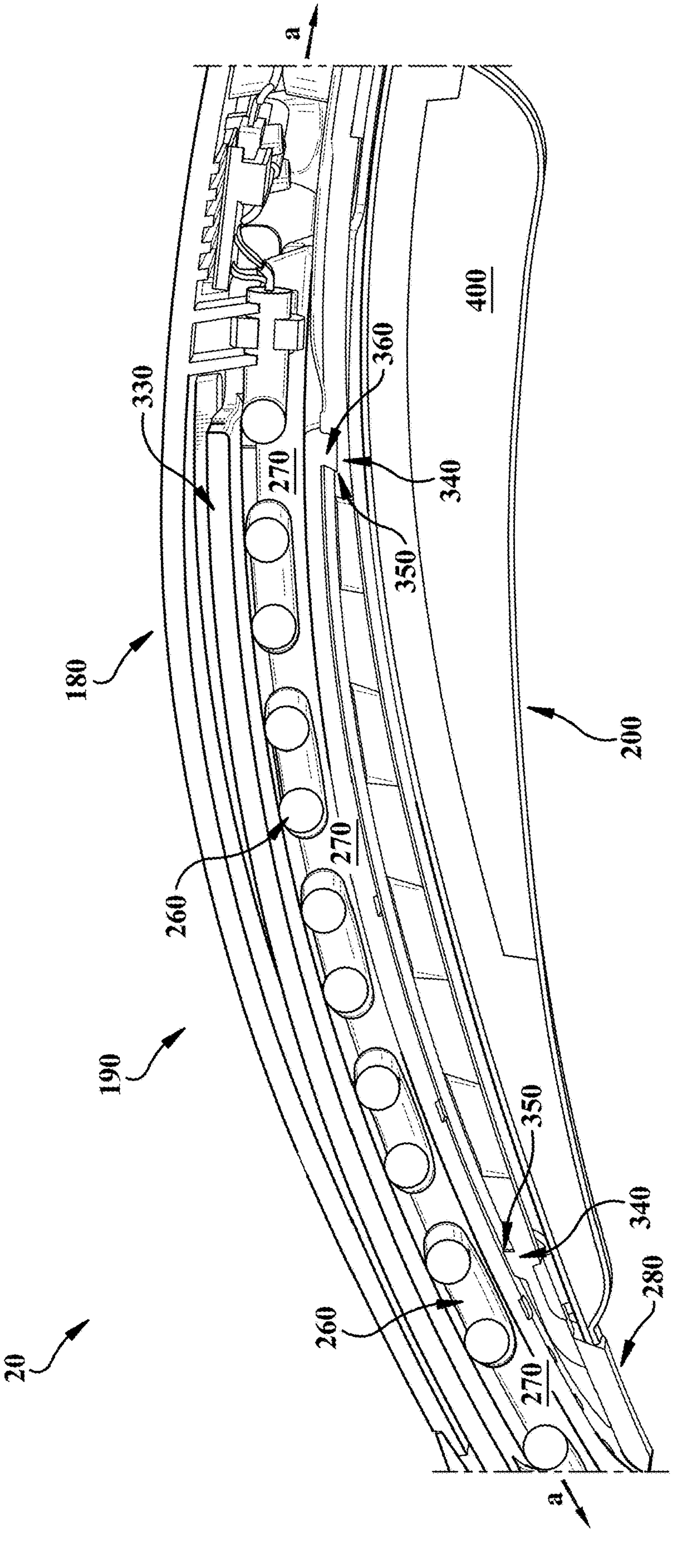
FIG. 7 shows a cross-sectional view of a portion of a headband section according to various implementations.
Figure 8:
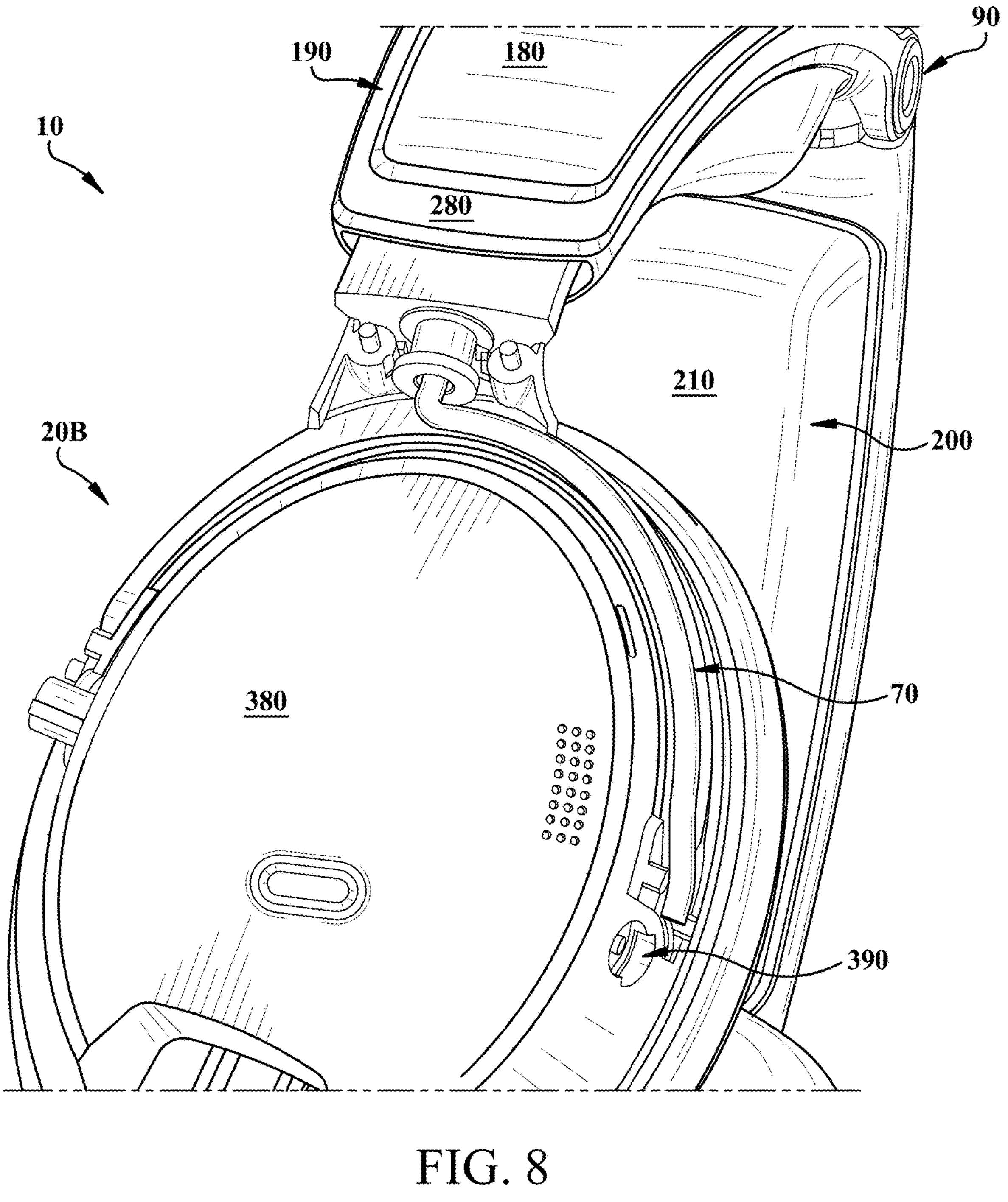
FIG. 8 shows a partial cut-away view of an earphone in a headset according to various implementations.

In some cases, e.g., as shown in FIG. 7, the headset 10 includes an adjustment limiter 340 for preventing unintentional removal of the removable cable holder 270. In certain cases, the adjustment limiter 340 includes at least one protrusion or recess 350 (e.g., lip, ridge, or edge) on an inner surface of the headband 30 for engaging a corresponding protrusion 360 on the removable cable holder 270. For example, as shown in FIGS. 6 and 7, the lower cap 200 can include an inner surface 370 with protrusion 360 for engaging the protrusion (or recess) 350 on the adjustment limiter 340, and preventing translation of the adjustment limiter 340. In certain cases, multiple protrusions 360 on the lower cap 200 can engage multiple protrusions (or recesses) 350 on the lower surface of the removable cable holder 270. In various example implementations, in order to disconnect an earphone 20 (and associated section of the cable 70), the lower cap 200 must be removed to free the removable cable holder 270 to slide out of the headband 30. That is, the protrusions (or recesses) 350, 360 can be sized to interface with enough interference to prevent translation of the removable cable holder 270 while the lower cap 200 is coupled to the headband 30. In other example implementations, the interference between the protrusions 350, 360 can be overcome without removal of the lower cap 200, e.g., by manually lifting the earcup 20 (and coupled cable holder 270) to disengage the protrusions 350, 360.

As noted herein, in some aspects, each earcup 20 includes a driver (also referred to as an electro-acoustic transducer herein) for providing an audio output to a user. As illustrated in the partially cut-away view of an earcup 20B in FIG. 8, the cable 70 connects with each earcup 20 at an outer casing 380, e.g., an opening 390 in the outer casing 380 of the earcup 20. In various implementations, the opening 390 is connected with an acoustically sealed back volume (not shown) behind the driver. For example, the wiring in each earcup 20 can be part of a sealed assembly behind the ear. In various implementations, the sealed assembly can enhance passive noise attenuation in the headset 10. Additional aspects of an earcup similar to earcup 20 are included in U.S. Pat. No. 11,212,609 ("Wearable Audio Device with Tri-Port Acoustic Cavity," issued Dec. 28, 2021), which is entirely incorporated by reference herein. In some cases, the outer casing 380 is coupled (e.g., via an interface) with a cushion 400, e.g., an ear cushion for resting on or near the ear of the user.

As noted herein, the headset 10 is operational with only one of the earphones 20 (e.g., earphone 20A), such that with one of the earphones removed (e.g., earphone 20B), the remaining earphone 20A is connected to a power source, enables audio output (e.g., at the driver), and enables audio communication (e.g., via a communications device in the microprocessor at each earphone and/or the circuit board 130).

While earphones 20 are illustrated herein as including a pair of over-ear headphones, it is understood that the earphones 20 can include any suitable form of earcup or earphone, e.g., a pair of earbuds, a pair of on-ear headphones, or a pair of near-ear headphones.

In contrast to conventional audio headsets, various implementations include audio headsets that are configured to operate modularly, for example, with one earphone removed from the headset. Further, the audio headsets disclosed according to implementations enable access to individual earphones, e.g., for servicing, replacement and/or modular operation. The audio headsets disclosed herein also include a spring system for enhancing occlusion of the earphones on the user's ear while shielding the user from internal wiring in the headset. Further, the audio headsets disclosed herein can effectively hide cabling from the user's perspective. When compared with conventional headsets, the audio headsets disclosed according to various implementations can provide enhanced modularity, servicing, aesthetic appeal, and comfort for users.

Various mating features and mechanical interfaces are illustrated and described herein. These mating features can enable snap-fit and/or friction-fit interaction between components in the headset 10, e.g., enabling coupling and decoupling of earphones 20 from the headset 10. Particular mating features illustrated herein can include recesses and corresponding protrusions or tabs. Additional example mating features can include pin/slot configurations, tongue/groove configurations, rivet configurations, adhesive couplings, press-fit couplings, snap-fit couplings, welded couplings and/or other known mating couplings. Certain coupling configurations can be combined, e.g., using a threaded coupling with an adhesive such as a glue. Additionally, intervening materials or components such as washers, lubricants, or sleeves can be located between mating features in some implementations.

One or more components described herein can be formed according to known manufacturing methods, e.g., molding, casting, forging or additive (e.g., three-dimensional) manufacturing, and can be formed from known materials, e.g., a metal such as aluminum or steel, a thermoplastic material (e.g., polycarbonate (PC) or acrylonitrile butadiene styrene (ABS)) or a composite material (e.g., PC/ABS). Certain components can include materials used for damping motion, such as silicone, a thermoplastic (e.g., POM) or a thermoplastic elastomer (TPE).

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

We claim:

1. An audio headset, comprising:

a pair of earphones;

a headband connecting the pair of earphones;

a cable connecting the pair of earphones through the headband, wherein the earphones are removably coupled with one another such that the audio headset is operational with only one of the earphones connected with the headband while a second one of the earphones is physically separated from the headband, wherein the earphone that remains connected with the headband is configured to operate as a single earphone while the headband rests over a head of a user;

a removable cable holder in at least one section of the headband, and an adjustment limiter for preventing unintentional removal of the removable cable holder, wherein a portion of the cable extending through the headband is positioned in an in-line switchback configuration to mitigate mechanical stress on the cable in response to adjustment of at least one of the earphones, and wherein the removable cable holder enables removal of the portion of the cable.

2. The audio headset of claim 1, wherein the headband includes a first headband segment, a second headband segment, and a spring connecting the first headband segment and the second headband segment.

3. The audio headset of claim 2, wherein the spring is located at a top portion of the audio headset when worn by the user.

4. The audio headset of claim 2, wherein the spring includes a slot.

5. The audio headset of claim 4, wherein the cable extends from the first headband segment to the second headband segment through the slot.

6. The audio headset of claim 2, wherein the spring is located at a hinge between the first headband segment and the second headband segment, wherein the hinge is visible from an exterior of the audio headset, and wherein the cable is visually obstructed at the exterior of the audio headset.

7. The audio headset of claim 2, wherein the spring includes at least one torsion spring that provides a linear clamping force on the headband, wherein the linear clamping force enhances acoustic performance for the audio headset across a variety of users having distinct head sizes.

8. The audio headset of claim 1, further including a circuit board in the headband, wherein the cable includes a first section connected with a first one of the earphones and a first side of the circuit board, and a second section connected with a second one of the earphones and a second side of the circuit board, wherein through-headband wiring of the cable mitigates mechanical stress on the connection between the first section and the circuit board and the second section and the circuit board.

9. The audio headset of claim 8, further including a removable cap on at least a portion of the headband, wherein the cap enables access to at least one of the connection between the first section and the circuit board or the connection between the second section and the circuit board.

10. The audio headset of claim 9, wherein the cap enables access to at least one of the connection between the first section and the circuit board or the connection between the second section and the circuit board.

11. The audio headset of claim 8, wherein the first section has a multi-pin segment connector for connecting with the circuit board, wherein the second section is fixed to the circuit board.

12. The audio headset of claim 1, further including:

a circuit board in the headband, and at least one grounding wire connected with the circuit board for providing electro-static discharge (ESD) protection for the audio headset.

13. The audio headset of claim 1, wherein each earphone includes a driver, and wherein the cable connects with each earcup proximate an acoustically sealed back volume behind the driver.

14. The audio headset of claim 1, wherein the audio headset is operational with only one of the earphones such that with one of the earphones removed, a remaining earphone is connected to a power source, enables audio output and enables audio communication.

15. The audio headset of claim 1, wherein each of the earphones contains a separate microprocessor for enabling independent operation thereof.

16. The audio headset of claim 1, wherein the pair of earphones includes a pair of earcups.

17. The audio headset of claim 1, wherein the pair of earphones includes a pair of earbuds, a pair of on-ear headphones, or a pair of near-ear headphones.

18. The audio headset of claim 1, further comprising an electro-acoustic transducer in each of the earphones for providing an audio output to the user.

19. An audio headset, comprising:

a pair of earphones;

a headband connecting the pair of earphones;

a cable connecting the pair of earphones through the headband; and a circuit board in the headband, wherein the earphones are removably coupled with one another such that the audio headset is operational with only one of the earphones connected with the headband while a second one of the earphones is physically separated from the headband, wherein the earphone that remains connected with the headband is configured to operate as a single earphone while the headband rests over a head of a user, wherein the cable includes a first section connected with a first one of the earphones and a first side of the circuit board, and a second section connected with a second one of the earphones and a second side of the circuit board, and wherein through-headband wiring of the cable mitigates mechanical stress on the connection between the first section and the circuit board and the second section and the circuit board.

20. The audio headset of claim 19, further including a removable cap on at least a portion of the headband, wherein the cap enables access to at least one of the connection between the first section and the circuit board or the connection between the second section and the circuit board.

21. An audio headset, comprising:

a pair of earphones;

a headband connecting the pair of earphones, wherein the headband includes: a first headband segment, a second headband segment, and a spring connecting the first headband segment and the second headband segment, the spring including a slot; and a cable connecting the pair of earphones through the headband, wherein the earphones are removably coupled with one another such that the audio headset is operational with only one of the earphones connected with the headband while a second one of the earphones is physically separated from the headband, wherein the earphone that remains connected with the headband is configured to operate as a single earphone while the headband rests over a head of a user, and wherein the cable extends from the first headband segment to the second headband segment through the slot.

22. The audio headset of claim 21, wherein each earphone includes a driver.

* * * * *